(12) United States Patent
Novak et al.

(10) Patent No.: US 8,443,851 B2
(45) Date of Patent: May 21, 2013

(54) OVERFILL PREVENTION CONTROL FOR FLUID STORAGE CONTAINER

(75) Inventors: Jeremy P. Novak, Whitmore Lake, MI (US); Matthew L. Erdmann, Ypsilanti, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 13/242,232

(22) Filed: Sep. 23, 2011

(65) Prior Publication Data
US 2012/0012583 A1 Jan. 19, 2012

Related U.S. Application Data

(62) Division of application No. 12/212,859, filed on Sep. 18, 2008, now Pat. No. 8,056,589.

(51) Int. Cl.
*B65B 1/30* (2006.01)
(52) U.S. Cl.
USPC .......................................... 141/198; 141/250

(58) Field of Classification Search
USPC ................. 141/198, 250, 302, 303, 350, 325, 141/326, 348
See application file for complete search history.

(56) References Cited

U.S. PATENT DOCUMENTS

| | | | | |
|---|---|---|---|---|
| 4,573,694 A * | 3/1986 | Goto et al. | ..................... | 280/834 |
| 5,390,808 A * | 2/1995 | Choma et al. | ................ | 220/86.2 |
| 5,568,828 A * | 10/1996 | Harris | ............................. | 141/348 |
| 6,065,507 A * | 5/2000 | Nanaji | ............................. | 141/59 |
| 6,152,196 A * | 11/2000 | Kehoe | ............................. | 141/198 |

* cited by examiner

*Primary Examiner* — Davis Hwu
(74) *Attorney, Agent, or Firm* — Quinn Law Group, PLLC

(57) ABSTRACT

An overfill prevention device is provided for preventing overflow of a fluid storage tank. The overfill prevention device includes a filler cup designed to fit within the fill opening of the tank body and attach thereto. A seal that is adapted for receiving and sealing to a fill nozzle is placed between upper and lower regions of the filler cup. A breather piece, which defines a vapor path with first and second openings, is integrated with the filler cup. The first opening of the breather piece is fluidly coupled to the lower cup region, whereas the second opening is positioned above the first opening, located at or below the full level of the storage tank.

20 Claims, 2 Drawing Sheets

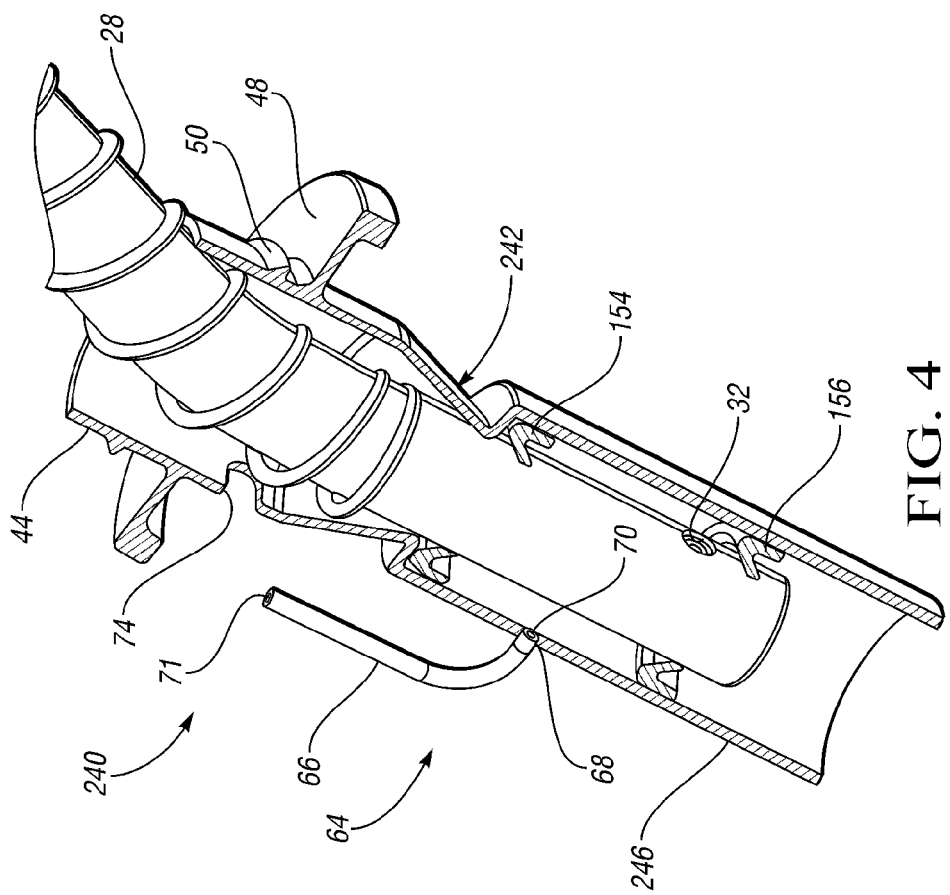
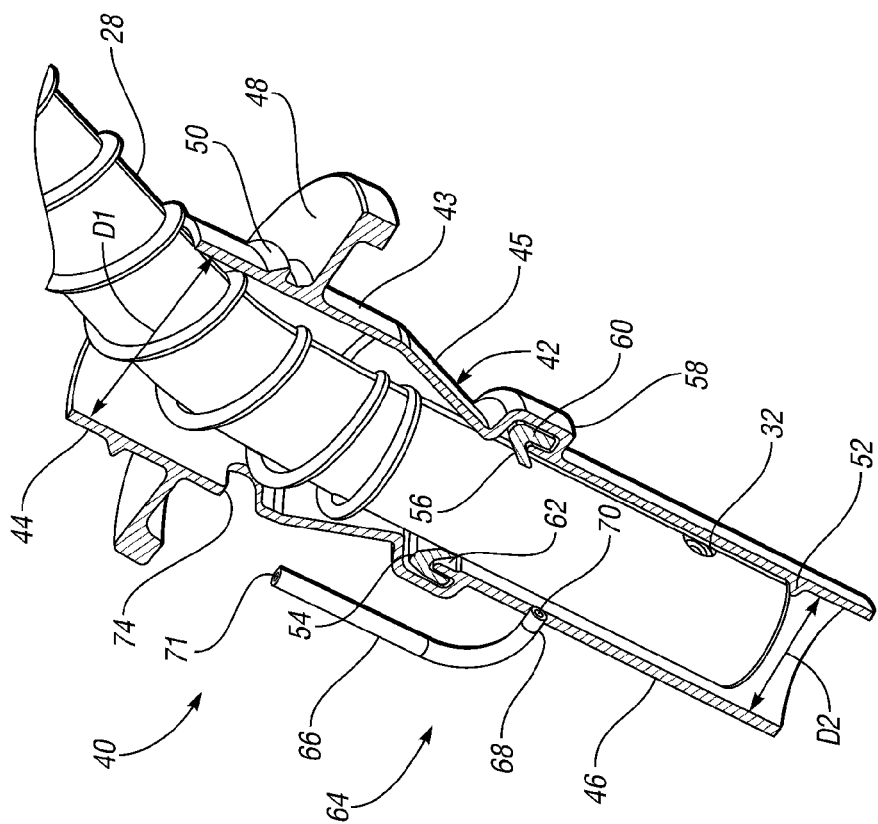

OVERFILL PREVENTION CONTROL FOR FLUID STORAGE CONTAINER

CROSS REFERENCE TO RELATED APPLICATIONS

This application is a divisional application of U.S. patent application Ser. No. 12/212,859 filed on Sep. 18, 2008, which is hereby incorporated by reference in its entirety.

TECHNICAL FIELD

The present invention relates generally to fluid storage containers, and more specifically to devices for preventing overflow spills in a fuel tank.

BACKGROUND OF THE INVENTION

A wide array of storage tanks and containers are used for holding and transporting various types of fluids. For example, most motorized vehicles, such as the modern-day automobile, are manufactured with an internal fuel tank for safely storing combustible petroleum-based fuel, such as gasoline and diesel. Personal fuel containers, more commonly known as "gas cans" or "gas caddies", are also available for manually transporting smaller quantities of fuel.

Fuel tanks are traditionally refilled at public gas stations. Most are designed to receive a fill pump nozzle in order to replace the contents of the container. To comply with legal regulations, nearly all fill pump nozzles include an automatic shutoff mechanism for discontinuing the flow of fuel from the nozzle when the fuel in the container reaches a predetermined position or level. Typically, a fill-limiting sensors is triggered when the fuel tank is full, and fuel begins to "back up" the filler neck to reach or spray the fill-limiting sensor. Even with an automatic shutoff mechanism, fuel pump operators may inadvertently overfill a fuel tank in an to fill the container "completely".

Many fluid storage containers, such as those used in automobiles, include a spout or inlet fluidly coupled to the tank body by an elongated filler pipe. Small gas tank configurations, for example those used in motorcycles, boats, personal watercraft, commercial law equipment, all-terrain recreational vehicles, gas cans, etc. may not have a fill neck. Be that as it may, small gas tanks are often designed to have the liquid level near the opening of the tank when full. Consequently, small gas tanks may prematurely trigger the fill-limiting sensor on the fill pump nozzle before the container is completely filled because the fill-limiting sensor, when inserted into the tank, may be several inches below the intended full level. To offset this feature, many operators do not insert the nozzle completely into the opening, which often leads to an overflow spill.

Overfilling a storage tank may result in damage to the tank, vehicle, or filling equipment, contamination of land or ground water, or other serious results. Concerns over spillage of the tank contents are particularly acute when the tank contents are flammable, toxic, or environmentally hazardous. Some contemporary estimates of such fuel spillage are in excess of six million gallons annually in the United States alone. The resultant fuel losses are economically and ecologically detrimental in terms of wasted fuel resources and environmental contamination.

SUMMARY OF THE INVENTION

According to one embodiment of the present invention, an overfill prevention device for precluding overflow (e.g., inadvertent overfill spills) of a fluid storage tank is provided. The storage tank is designed to be filled via a fill nozzle having a fill-limiting sensor at one end thereof. The fluid storage tank has a tank body with a fill opening formed therethrough. The tank body is designed with a predetermined full level. The overfill prevention device includes a filler cup member configured to fit within the fill opening of the tank body. The filler cup member has opposing upper and lower cup regions. A seal member, adapted for receiving and sealing to the nozzle, is situated between the upper and lower cup regions. A breather piece is integrated with (e.g., formed in or attached to) the filler cup member. The breather piece defines a vapor path with first and second openings, wherein the first opening is coupled to the lower cup region of the filler cup member, below the seal, and the second opening is located generally at the predetermined full level. The present invention ensures the fluid container may be filled to the intended full height while preventing overfill spills.

According to one aspect of this particular embodiment, the first opening of the breather piece is vertically lower than the second opening relative to the tank body.

In another aspect of this embodiment, the diameter of the lower cup region is less than the diameter of the upper cup region.

According to another aspect, the upper cup region defines a vent window therethrough. The vent window is configured to evacuate vapor from the tank body during refill thereof. As an alternative, an auxiliary vapor dump line that is configured to evacuate vapor from the tank body during refill thereof may be integrated to the tank body. This feature redirects vapor away from the user, and allows for implementation of a vapor storage system, such as a carbon canister.

In accordance with yet another aspect of this embodiment, the filler cup member is designed to create a mechanical hard stop for the nozzle. That is, the nozzle is oriented at a preselected height inside the tank body when received in and mated with the filler cup member.

According to yet another aspect, the upper cup region includes a tank mounting flange adapted to releasably attach the overfill prevention device to the tank body. Alternatively, the upper cup region includes an adapter configured to permanently attach the overfill prevention device to the tank body.

As part of another aspect of this embodiment, the breather piece is a breather tube fluidly coupled to a bleed hole that is formed through the lower cup region of the filler cup member.

As part of yet another aspect, the overfill prevention device includes a second seal member that is operatively oriented below both the first seal member and the breather piece to receive and seal to the nozzle below the fill-limiting sensor (e.g., an aspirator).

According to another embodiment of the present invention, an overfill prevention device for preventing overflow spills of a fluid storage container is provided. The overfill prevention device includes a filler cup member that is configured to receive a fill nozzle having a fill-limiting sensor proximate to an outlet end thereof. The filler cup member has opposing upper and lower cup regions. The upper cup region is adapted to fit within the fill opening of the tank body and sealingly integrate thereto, while the lower cup region is disposed entirely inside the tank body. A seal member adapted for receiving and sealing to the nozzle is operatively attached to the filler cup member intermediate the upper and lower cup regions. A breather piece is integrated with the filler cup member. The breather piece defines a vapor path with first and second openings, wherein the second opening is positioned just below the predetermined full level of the tank body. The first opening, on the other hand, is fluidly coupled to the lower cup region vertically lower than the second opening relative to the tank body.

According to one aspect of this embodiment, the lower cup region and the seal member cooperate to create an air pocket around the fill-limiting sensor when the nozzle is received by and mated with the seal and fluid is being discharged from the nozzle.

In another aspect, the upper cup region is substantially cylindrical and has a first diameter. The lower cup region is also substantially cylindrical, but has a second diameter that is less than the first diameter of the upper cup region.

In accordance with another embodiment of the present invention, a fluid storage container is provided. The fluid storage container includes a tank body with a predetermined full level. The fluid storage container includes a filler cup having opposing generally cylindrical upper and lower cup regions. The upper cup region is attached to the tank body, and configured to receive the fill nozzle. The lower cup region is disposed inside the tank body. An annular seal is operatively attached to the filler cup intermediate the upper and lower cup regions, and adapted for receiving and sealing to the nozzle. A breather piece is integrated with the filler cup member. The breather piece defines a vapor path with first and second openings. The second vapor path opening is located below the predetermined full level of the tank body. The first vapor path opening is fluidly coupled to the lower cup region vertically lower than the second opening relative to the tank body.

As part of one aspect of this particular embodiment, the storage container is characterized by a lack of a filler neck fluidly coupling the filler cup member to the tank body.

In accordance with another aspect, the seal member and breather piece are operatively oriented inside the tank body.

According to another aspect, the upper cup region defines a vent window therethrough. The vent window directly fluidly couples the internal vapor space of the tank body to the outside atmosphere to thereby evacuate entrained vapor from the tank body during refill thereof.

The above features and advantages, and other features and advantages of the present invention, will be readily apparent from the following detailed description of the preferred embodiments and best modes for carrying out the present invention when taken in connection with the accompanying drawings and appended claims.

BRIEF DESCRIPTION OF THE DRAWINGS

FIG. 3 is an enlarged partially cut-away perspective-view illustration of the overfill prevention device of FIG. 1; and FIG. 4 is an enlarged partially cut-away perspective-view illustration of an overfill prevention device in accordance with another embodiment of the present invention.

DESCRIPTION OF THE PREFERRED EMBODIMENTS

Figure 1:
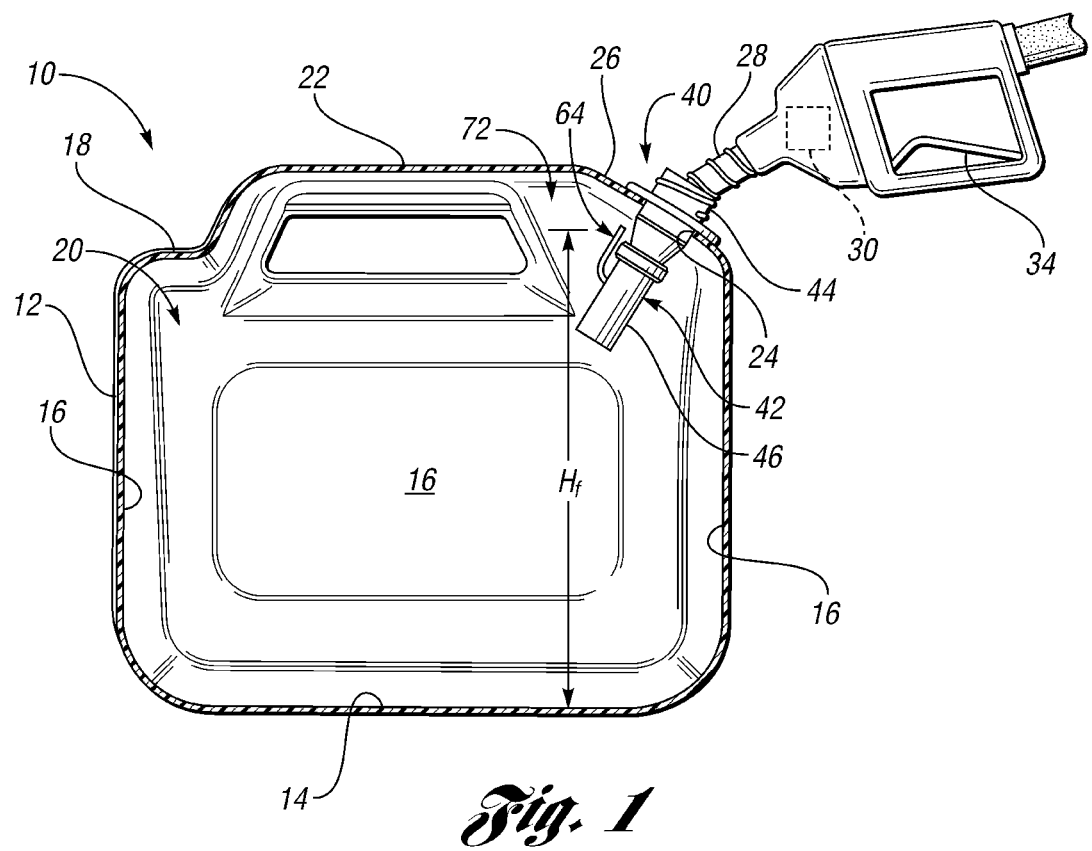
FIG. 1 is a side-view illustration of a representative fluid storage tank partially cut away to show an overfill prevention device in accordance with one embodiment of the present invention attached thereto.

Referring to the drawings, wherein like reference numbers refer to like components throughout the several views, FIG. 1 is a partially cut-away, side-view illustration of an exemplary fluid storage container (also referred to herein as "storage tank"), identified generally as 10, with which the present invention may be incorporated and practiced. It should be readily understood that the fluid containers depicted herein are merely representative applications by which the present invention may be utilized. As such, the present invention is by no means limited to the container configurations shown in the drawings. In addition, the drawings presented herein are not to scale and are provided purely for instructional purposes. As such, the specific and relative dimensions shown in the drawings are not to be considered limiting.

Looking first to FIG. 1, the fluid storage container 10, shown as a totable or portable "gas can", includes a container body 12 (also referred to herein as "tank body" or "body") which includes a base wall 14, a plurality of side walls 16 (three of which are visible in FIG. 1), and a top wall 18 that collectively define an interior or internal storage volume 20 for stowing and transporting fuel. The top wall 18 has a hollow handle 22 formed integrally therewith. A fill opening 24 is fashioned through a forward, angled surface 26 which extends between a forward-most side wall 16 and the top wall 18. The tank body 12 is designed with a predetermined full level—e.g., a preselected fluid height $H_f$ which is near or equal to a maximum allowable fluid volume.

The storage container 10 is adapted, as will be explained in extensive detail hereinbelow, to accept a fluid-dispensing fill nozzle 28, which may be part of a conventional service station fuel pump (not visible in the drawings). The fill nozzle 28 has a fill-limiting sensor, shown schematically at 30 in FIG. 1, with an aspirator hole 32 (best seen in FIGS. 3 and 4) at a distal end of the nozzle 28. In operation, a user (not shown) inserts the fill nozzle 28 into the container 10, through fill opening 24, and engages the pump handle 34 to begin filling the container 10. The filling process is automatically regulated by the fill-limiting sensor 30 in the pump nozzle 28. The fill-limiting sensor 30 operates to automatically shut-off fuel flow from the nozzle 28 before the fuel can accumulate sufficiently such as to overflow from the container 10.

In accordance with the present invention, the fluid container 10 includes an overfill prevention device (OPD), generally designated by reference numeral 40, for preventing overflow or inadvertent overfill spills. Referring to both FIGS. 1 and 3, the OPD 40 includes a filler cup member 42 that is adapted to fit within the container fill opening 24. Specifically, the filler cup member 42 is composed of opposing upper and lower cup regions 44 and 46, respectively. The upper cup region 44 is shaped and dimensioned to fit within or essentially form the fill opening 24 of the tank body 12, and sealingly integrate thereto. For example, the upper cup region 44 includes a substantially cylindrical portion 43 with a frusta-conical portion 45 extending from a lower end thereof. In the embodiment of FIG. 3, the upper cup region 44 includes a tank mounting flange or adapter 48 extending generally orthogonally outward from the cylindrical portion 43 just below a plurality of helical threads 50 intended to threadably mate with a cap (not shown). The tank mounting flange/adapter 48 may be designed to releasably attach the overfill prevention device 40 to the tank body 12. By way of example, and not limitation, the tank mounting flange/adapter 48 may be adapted to press-fit with or threadably engage to a tank spout (not visible) protruding outward from the angled surface 26 of the tank body 12. Alternatively, the tank mounting flange/adapter 48 may be configured to permanently attach the OPD 40 to the tank body 12 (e.g., via arc welding, sonic welding, etc.). Once the upper cup region 44 is properly attached to the container 10, the lower cup region 46 is disposed entirely inside the tank body 12, as seen in FIG. 1.

Ideally, the fluid storage container 10 is characterized by a lack of a filler neck or similar fluid conduit designed to fluidly couple the filler cup member 42 to the tank body 12.

Should the nozzle 28 be inserted fully, the filler cup member 42 is designed to create a mechanical hard stop for the nozzle 28 (although the nozzle 28 need not be inserted fully for the OPD 40 to function). The cylindrical portion 43 of the upper cup region 44 has a first diameter D1. The lower cup region 46 is also substantially cylindrical, but has a second diameter D2 that is less than the first diameter D1 of the upper cup region 44. As such, when the nozzle 28 is passed through the upper cup region 44—i.e., from the cylindrical portion 43 through the frusta-conical portion 45, into the lower cup region 46, a portion of the nozzle 28 will come into contact with, and press against the upper peripheral edge of the cylindrical portion 43, as seen in FIG. 3, thereby orienting the nozzle 28 at a preselected height inside the tank body 12. Alternatively, a nozzle stop 52 (FIG. 3) may be formed at a preselected position on the lower cup region 46, protruding inward from the inner-diameter (ID) surface thereof, to create a mechanical stop inhibiting further translation of the nozzle 28. The filler cup configuration of the present invention will also hold the nozzle 28 in place, allowing the user to release the nozzle 28 while filling.

The upper filler region cup 44 is separated from the lower cup region 46 by an annular, elastomeric seal member 54, which is adapted for receiving and sealing to the nozzle 28. In the embodiment of FIG. 3, the filler cup member 42 defines a toroidal seal seat 58 within which nests a bead rim portion 60 of the seal member 54. A flap 62 operates to keep the bead rim portion 60 inside the seal seat 58. A lip 56 that extends radially inward from the bead rim portion 60 fits firmly around the inserted fill nozzle 28 to seal the lower portion of the OPD 40 and nozzle 28 while also reducing "spitback" during refilling of the container 10.

As fluid is pumped at high velocity from the fill nozzle 28, a "dynamic liquid seal" is created between the nozzle 28 and the lower cup region 46 near the tip of the nozzle interface. In this dynamic condition, a pressure drop will occur in the space between the dynamic liquid seal and the elastomeric seal member 54. The breather piece 64 provides a vent path connecting this space to the vapor dome of the container 10, which enables flow into this air pocket which keeps the air pocket from collapsing as the liquid level rises beyond the outlet end of the lower cup region 46. By creating an air pocket in this manner, the OPD 40 can control the aspirator 32 and its ability to signal the nozzle 28 to shut off, which in turn protects the aspirator hole 32 from liquid so that the shutoff height (e.g., the full level fluid height Hf) can be above aspirator hole 32.

With continuing reference to FIGS. 1 and 3, a breather piece, designated generally at 64, is integrated with the filler cup member 40. In the embodiment of FIG. 3, the breather piece 64 includes an elongated breather tube 66 fluidly coupled to a bleed hole 68 that is formed through the lower cup region 46 of the filler cup member 42. Alternatively, the breather piece 64 may be integrally formed into the filler cup member 42 and take on other various configurations without departing from the intended scope of the present invention. The breather piece 64 defines a vapor path with first and second openings 70 and 71, respectively. As seen in FIG. 1, the second opening 71 is positioned at or just below the predetermined full level $H_f$ of the tank body 12. It should be understood, however, that the orientation and location of the second opening 71 may be modified so long as it is in the general vicinity of the full level height $H_f$. The first opening 70, on the other hand, is fluidly coupled to the lower cup region 46 vertically lower than the second opening 71 relative to the container 10. Accordingly, the breather piece 64 is operatively oriented entirely inside the tank body 12.

The breather piece 64 is provided to collapse the air pocket around the fill nozzle 28 in a controlled manner. For example, when fluid is discharged from fill nozzle 28 into the internal volume 20, a pressure differential is created which pulls make-up air from the resultant vapor space 72 (i.e., remaining portion of internal volume 20 not filled with fluid) through the breather tube 66 into the lower cup region 46, thereby preventing a vacuum from forming and collapsing the air pocket. However, when the liquid level reaches the intended full level fluid height $H_f$ at the top of the breather tube 66, the air pocket around the nozzle 28 will collapse sucking liquid through the second opening 71 of tube 66 and the up outlet end of the lower cup region 46 onto the aspirator hole 32, thereby triggering the fill-limiting sensor 30. The present invention allows the aspirator hole 32 to be located vertically lower than the intended full height $H_f$ without prematurely triggering nozzle shut-off, thus ensuring the container 10 may be filled to the intended full height $H_f$ while preventing overfill spills. This innovation provides an easier way to fill fluid storage containers to the intended fill limit without having to closely monitor the refilling status or adjusting the nozzle position.

A vent window 74 is defined through the upper cup region 44, as is best seen in FIG. 3. The vent window 74 is designed to evacuate entrained vapor from the tank body 12 during refill of the fluid storage container 10. Put another way, the vent window 74 directly fluidly couples the internal vapor space 72 of the tank body 12 to the outside atmosphere. As fluid is pumped into the internal volume 20, air trapped inside the container 10 will be forced upwards and out through the vent window 74.

Figure 2:
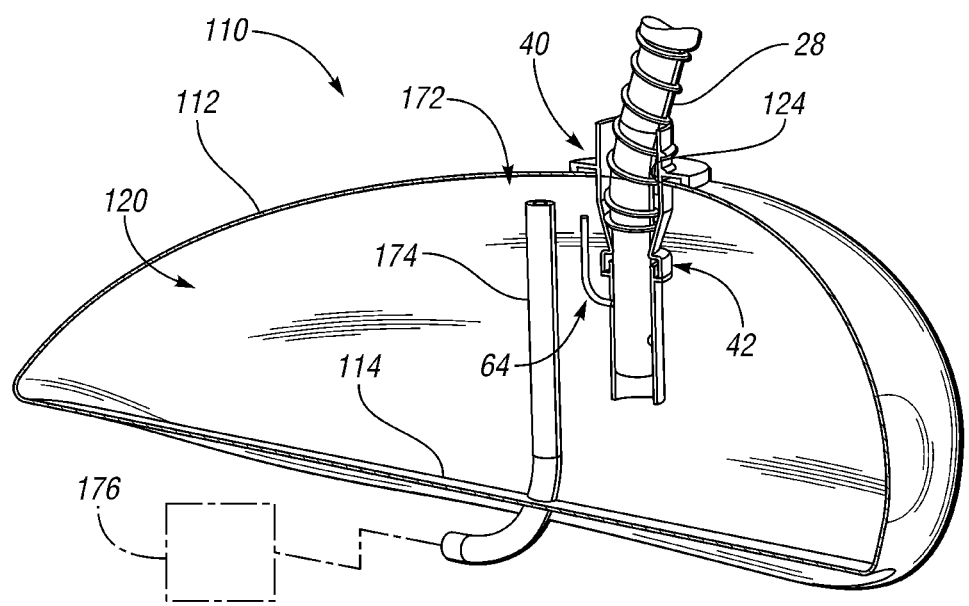
FIG. 2 is a perspective-view illustration of another representative fluid storage tank partially cut away to show the overfill prevention device of FIG. 1 and an auxiliary vapor dump line integrated thereto.

FIG. 2 of the drawings provides an alternative to the vent window 74. FIG. 2 is a perspective-view illustration of another representative fluid storage container 110, shown as a motorcycle gas tank. The container 110 includes a container body 112 that defines an internal storage volume 120 for stowing and transporting fuel. The overfill prevention device 40 described above with respect to FIGS. 1 and 2 is operatively oriented within a fill opening 124 formed in the container body 112, and welded thereto. An auxiliary vapor dump line 174, shown as an elongated pipe, extends through a cavity in the base wall 114 of the tank body 112, fluidly coupling the internal vapor space 172 to the outside atmosphere. Similar to the vent window 74, the vapor dump line 174 can be used to evacuate vapor from the tank body 112 during refill thereof, thus keeping vapor away from the operator. Notably, the vapor dump line 174 can be paired with an On-Board Refueling Vapor Recovery (ORVR) system or other system capable of storing evaporative emissions, represented schematically at 176 in FIG. 2.

Looking finally at FIG. 4, where like reference numbers are used to indicate similar constituent parts from FIGS. 1-3, an overfill prevention device (OPD) 240 is shown in accordance with another embodiment of the present invention. In the embodiment of FIG. 4, the OPD 240 includes first and second annular seal members 154 and 156, respectively, that are positively attached (e.g., adhered or fastened) to the inner-diameter surface of the lower cup region 246. Both the first and second seal members 154, 156 are adapted, similar to the seal member 54 of FIG. 2, for receiving and sealing to the nozzle 28. The second seal member 156, however, is operatively oriented below both the first seal member 154 and the first opening 70 of the breather piece 64 relative to the filler cup member 242 to receive and seal to the nozzle 28 below the aspirator hole 32. This design separates the tip of the nozzle 28 from the aspirator hole 32. As such, controlled shutoff of the fill nozzle 28 is driven by sealing off the vapor path until the liquid level reaches the intended full level fluid height $H_f$, at the top of the breather tube 66. At this point, liquid is sucked through the second opening 71 of tube 66 into the lower cup region 46 and onto the aspirator hole 32, thereby triggering the fill-limiting sensor 30.

While the best modes for carrying out the present invention have been described in detail, those familiar with the art to which this invention relates will recognize various alternative designs and embodiments for practicing the invention within the scope of the appended claims.

The invention claimed is:

1. An overfill prevention device for preventing overflow of a fluid storage tank which is fillable via a nozzle having a fill-limiting sensor at one end thereof, the fluid storage tank having a tank body with a fill opening formed therethrough, and the tank body having a predetermined full level, the overfill prevention device comprising:
   a filler cup member configured to fit within the fill opening of the tank body, the filler cup member having opposing upper and lower cup regions;
   a first seal member intermediate the upper and lower cup regions and adapted for receiving and sealing to the nozzle;
   a breather piece integrated with the filler cup member and defining a vapor path with first and second openings, wherein the first opening is coupled to the lower cup region, and the second opening is located generally at the predetermined full level; and
   wherein the first opening of the breather piece is vertically lower than the second opening relative to the tank body.

2. The device of claim 1, wherein the lower cup region and the first seal member cooperate to create an air pocket around the fill-limiting sensor when fluid is being discharged from the nozzle.

3. The device of claim 1, wherein the first opening of the breather piece is vertically lower than the second opening relative to the tank body.

4. The device of claim 1, wherein the upper cup region has a first diameter, and the lower cup region has a second diameter less than the first diameter.

5. The device of claim 1, wherein the upper cup region defines at least one vent window therethrough, the vent window configured to evacuate vapor from the tank body during refill thereof.

6. The device of claim 1, further comprising:
   an auxiliary vapor dump line integrated to the tank body and configured to evacuate vapor from the tank body during refill thereof.

7. The device of claim 1, wherein the filler cup member is configured to create a mechanical hard stop whereby the nozzle is oriented at a preselected height inside the tank body when received in and mated with the filler cup member.

8. The device of claim 1, wherein the upper cup region includes a tank mounting flange configured to releasably attach the overfill prevention device to the tank body.

9. The device of claim 1, wherein the upper cup region includes an adapter configured to permanently attach the overfill prevention device to the tank body.

10. The device of claim 1, wherein the breather piece is a breather tube fluidly coupled to a bleed hole formed through the lower cup region.

11. The device of claim 1, further comprising:
    a second seal member operatively attached to the filler cup and oriented below the first seal member and the breather piece and configured to receive and seal to the nozzle below the fill-limiting sensor.

12. The device of claim 1, wherein the upper cup region includes a mounting flange extending generally orthogonally outward therefrom and configured to operatively attach the overfill prevention device to the tank body.

13. A fluid storage container fillable via a fill nozzle having a fill-limiting sensor at one end thereof, the fluid storage container comprising:
    a tank body having a predetermined full level;
    a filler cup having opposing generally cylindrical upper and lower cup regions, the upper cup region attached to the tank body and configured to receive the fill nozzle, and the lower cup region disposed inside the tank body;
    an annular seal operatively attached to the filler cup intermediate the upper and lower cup regions and adapted for receiving and sealing to the nozzle;
    a breather piece integrated with the filler cup, the breather piece defining a vapor path with first and second openings, wherein the second opening is located immediately below the predetermined full level; and
    wherein the first opening of the breather piece is vertically lower than the second opening relative to the tank body.

14. The storage tank of claim 13, characterized by a lack of a filler neck fluidly coupling the filler cup to the tank body.

15. The storage tank of claim 13, wherein the annular seal and breather piece are operatively oriented inside the tank body.

16. The storage tank of claim 13, wherein a portion of the upper cup region in contact with an internal vapor space of the tank body defines a vent window therethrough, the vent window directly fluidly coupling the internal vapor space of the tank body to an external atmosphere to thereby evacuate entrained vapor from the tank body during refill thereof.

17. The storage tank of claim 13, wherein the filler cup is configured to create a mechanical hard stop whereby the nozzle is oriented at a preselected height inside the tank body when received in and mated with the filler cup.

18. The storage tank of claim 13, further comprising:
    another seal member operatively oriented below the annular seal member and the breather piece to receive and seal to the nozzle below the fill-limiting sensor.

19. A fluid storage container fillable via a fill nozzle having a fill-limiting sensor at one end thereof, the fluid storage container comprising:
    a container body defining a fill opening and having a predetermined full level;
    a filler cup having opposing upper and lower cup regions, the upper cup region sealably fitted to the fill opening of the container body and configured to receive the fill nozzle, and the lower cup region disposed inside the container body;
    a seal operatively attached to the filler cup intermediate the upper and lower cup regions and adapted for receiving and sealing to the nozzle;
    a breather piece integrated with the filler cup, the breather piece defining a vapor path with first and second openings, wherein the first opening is fluidly coupled to the lower cup region vertically lower than the second opening relative to the tank body; and
    wherein the storage container is characterized by the absence of a filler neck fluidly coupling the filler cup to the container body.

20. The fluid storage container of claim 19, further comprising:
    an auxiliary vapor dump line fluidly coupling an internal vapor space of the container body to an external atmosphere to thereby evacuate entrained vapor from the container body during refill thereof.

* * * * *